Patent 3,023,021 — Garden Carryall and Snow Remover

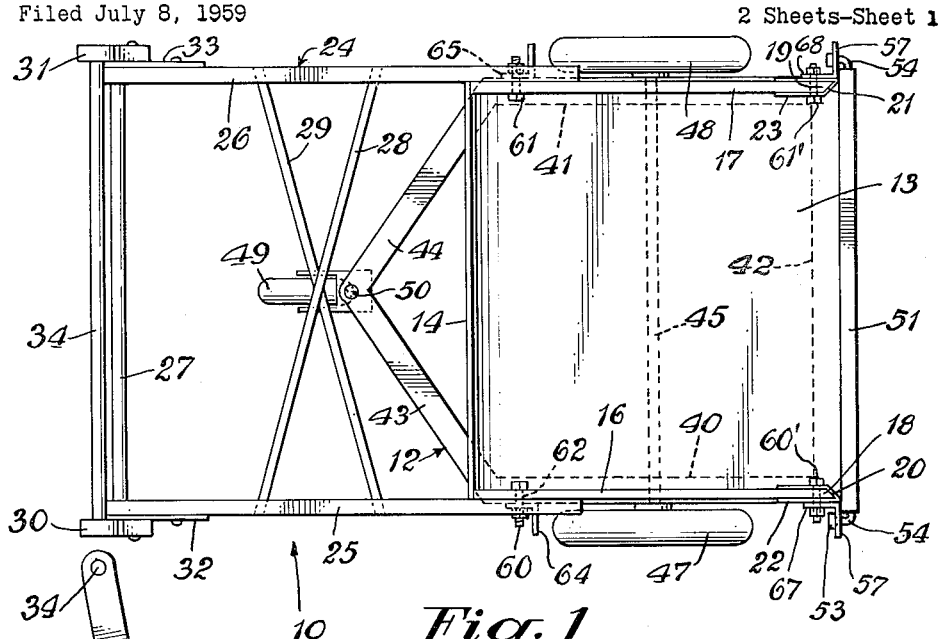

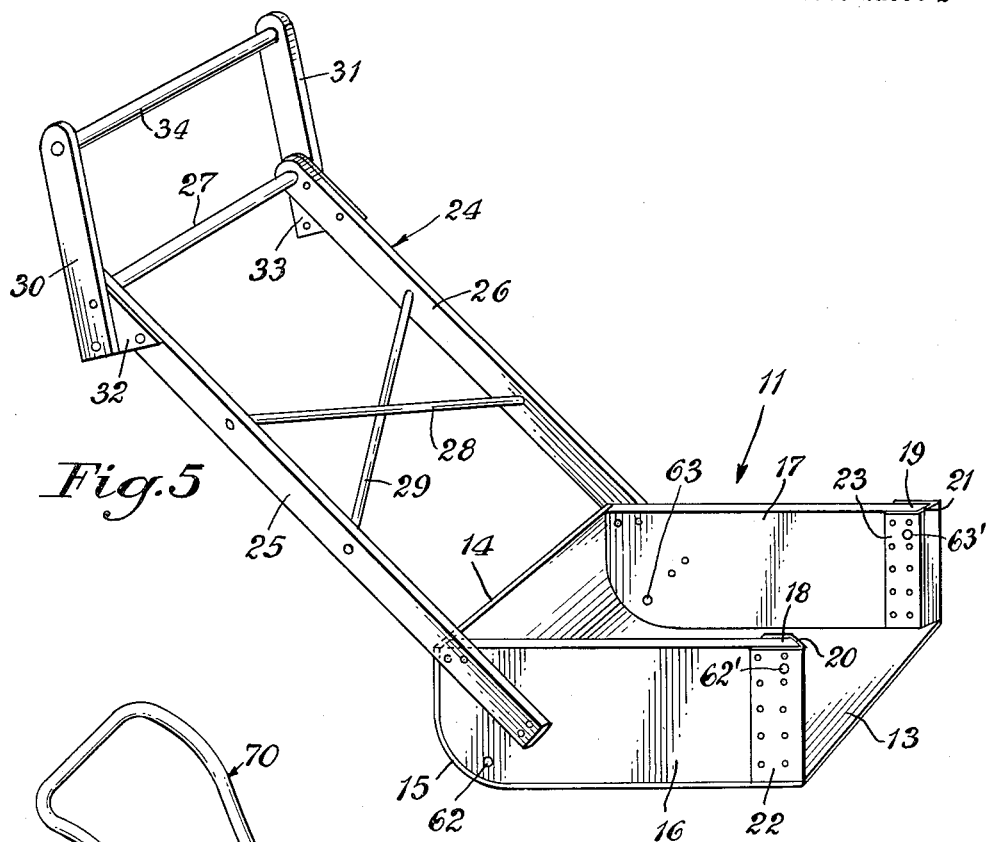
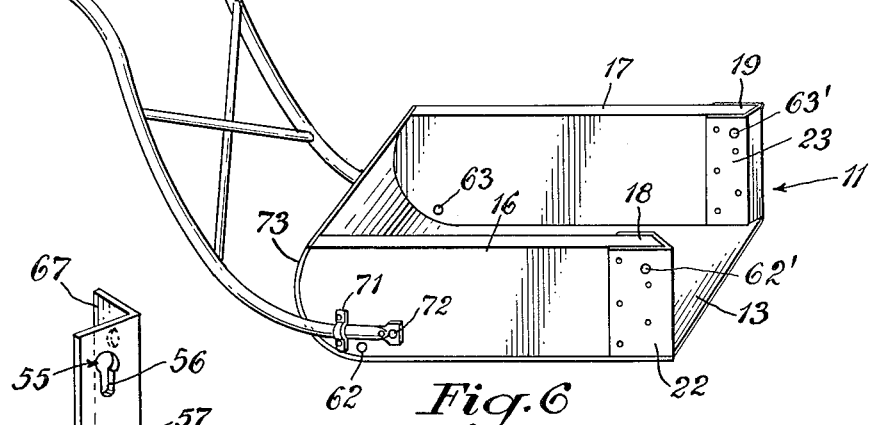
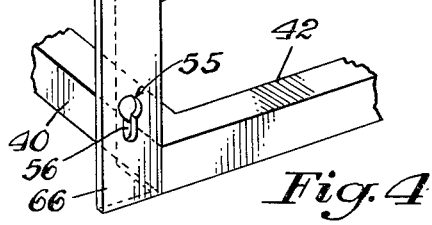

3,023,021
GARDEN CARRYALL AND SNOW REMOVER
Gerald J. Fricke, 3865 W. Giles Road, Muskegon, Mich., and Edward MacDonald, R.R. 4, Fremont, Mich.
Filed July 8, 1959, Ser. No. 825,847
3 Claims. (Cl. 280—47.34)

This invention relates generally to multi-purpose tools and specifically to a combination garden carryall and snow remover.

Multi-purpose tools are well known but quite frequently the best qualities of the individual tools are sacrificed to some degree when they are combined. Another disadvantage of many multi-purpose tools is that their cost is often higher than the total cost of the separate tools. In addition, the conversion accessories are often complicated and considerable time and effort is needed to convert the tools.

These factors are all important to the average home dweller faced with the tasks of shoveling snow in the winter and doing garden hauling in the summer. Many people either do not want to buy separate tools to do these different tasks or will not use multi-purpose tools because converting and reconverting is too much trouble.

Accordingly, a primary object of our invention is to provide a simple multi-purpose hauling apparatus useful for snow removal in the winter and general garden hauling in the summer wherein the best qualities of the individual components are preserved.

Another object is to provide a combination garden carryall and snow remover which may be quickly and easily changed from one to another in accordance with the needs of the season.

Another object is to provide a hauling apparatus having smooth, uninterrupted interior surfaces whereby conveyed materials may be easily and quickly discharged.

Yet a further object is to provide an extremely rugged container which can be quickly and easily connected by only a pair of bolts to a truck frame to provide a wheeled garden carryall.

Other objects and advantages of our invention will become apparent from the following description taken in connection with the accompanying drawings wherein by way of illustration and example certain embodiments of our invention are set forth.

Our invention is illustrated more or less diagrammatically in the accompanying drawings, wherein:

FIGURE 1 is a top plan view of our combination snow remover and garden carryall;
FIGURE 2 is an elevation of the carryall of FIGURE 1;
FIGURE 3 is a view of the closure end;
FIGURE 4 is a perspective view of a portion of the truck frame;
FIGURE 5 is a perspective view of the container subassembly of FIGURES 1 and 2; and
FIGURE 6 is a perspective view of a modified form of container.

Like reference numerals will be used to indicate like parts throughout the specification and drawings.

Our hauling apparatus is indicated generally at 10 in FIGURES 1 and 2. It consists essentially of a portable, removable container 11 mounted on a wheeled truck frame 12.

The container is open at the top and one end as shown best in FIGURE 5. It includes a bottom 13 having smooth upper and lower surfaces which terminate in rear wall 14. The rear wall is smoothly contoured into the bottom as at 15 to provide easy discharge of carried materials. A pair of substantially parallel side walls 16 and 17 are welded or otherwise suitably secured to the bottom and rear walls. Leading edges 18, 19 of the side walls are tapered as at 20 and 21 to form a knife edge which cuts into the material to be conveyed. Metal shields 22, 23 protect the thin leading edges.

A handle 24 extends upwardly and rearwardly from the rear of the container. In this instance the handle is attached to side walls 16 and 17, but it could be connected to the rear wall.

Although many variations are feasible, we have illustrated the handle in this instance as consisting of a pair of side frame elements 25 and 26 spaced apart by strut 27. Reinforcing braces 28, 29 provide rigid intermediate support. Side bars 30, 31, secured to plates 32, 33 which in turn are connected to the frame elements are spaced apart by handle bar 34 to form a convenient extension adjustable to the height of the user.

The wheeled truck frame 12 includes side channels 40 and 41 connected to front channel 42 and to converging rear channels 43, 44. Axle 45 is journaled in downwardly extending ears 46 and carries a pair of large wheels 47, 48. A small follower wheel 49 is swivelably connected as at 50 to the frame at the junction of rear channels 43, 44.

The forward end of the container is closed by front wall 51. Hooks or bolts 52 having enlarged heads 53 and L-shaped shanks 54 are received in the front wall. The bolts slip into keyholes 55 having tail slots 56 of a lesser diameter than the heads 53. The keyholes are formed in vertical brackets 57 secured by suitable means 58 to the forward ends of side channels 40 and 41.

The container is securely fastened to the rear of the truck frame by bolts 60, 61 passing through apertures 62, 63 in short rear brackets 64 and 65 located to the rear of the wheels. The longer forward brackets 57 include a front flange 66 and a trailing flange 67 which prevents side play of the container. If desired, bolts 60', 61' passing through holes 62', 63' in side walls may be utilized to eliminate any play between the container and frame.

A modification of the container is illustrated in FIGURE 6. In this instance the handle includes a smoothly contoured tubular member 70 secured to the rear of the container by bracket 71 and bolts 72. The rear wall slopes upwardly and rearwardly from its junction with the bottom and then upwardly and forwardly near the top edge of the wall as at 73. This upper forward slope of the rear wall forms in effect a packing bar or stop against which loose granular material may be packed when a shovel enters the container from the front end.

The use and operation of our invention is as follows:

We have provided a sturdy, compact hauling apparatus which may be easily converted from a garden carryall to a snow remover and vice versa. To use it as a snow remover, the container of FIGURES 5 or 6 may be used as a pusher or a shovel. It slides easily since its surfaces are smooth and substantially uninterrupted. The leading knife edges of the side walls have been covered with sheet metal 22 and 23 to cut easily into the snow drifts. Loose snow may be easily discharged since the bottom wall is contoured smoothly into the rear wall and there are no crevices or indentations which trap the snow and retard its discharge. Packed snow can be removed simply by tapping the rear wall. Stickier materials such as wet sand or gravel can be removed by scraping a shovel along the contoured rear wall. While the subassembly of FIGURES 5 and 6 will be used primarily as a snow remover, it is not so restricted in use and in fact can be used for pushing or shoveling any agglomerate material such as earth, gravel, coal or potatoes.

When moving a finely divided material such as loose sand the scoop or container of FIGURE 6 is especially useful. The upper inwardly flared edge 73 of the rear wall forms a backing board which presses the material onto the shovel if the material is not to be dumped as a load.

To convert to a garden carryall, the container of FIGURES 5 and 6 is placed on truck frame 12 with the front end positioned between trailing flanges 67, 68 of front brackets 57. Rear bolts 60, 61 or any other suitable securing means are passed through the short rear brackets 64, 65 and holes 62, 63 which provides a four point securement. To eliminate any possible play of the front end, front bolts 60′, 61′ secure the side walls to the front brackets.

Front wall 51 is fastened to the container by merely passing the enlarged heads 53 of hooks 52 through the top of the keyhole slots 55 and dropping the hooks into the shank ends 56 of the slots.

An especially important feature of our invention is that angles or brackets 57 align the front end of the container on the frame and prevent its wobbling. Often only bolts 60 and 61 are needed to securely fasten the container to the wheeled truck frame.

The foregoing description is illustrative only and not definitive. Accordingly, our invention should not be limited except by the scope of the following claims.

We claim:

1. A multi-purpose hauling apparatus for agglomerate materials and the like comprising an open-topped container having a bottom, said bottom having smooth, uninterrupted upper and lower surfaces, a pair of side walls, a rear wall, said rear wall having at least its lower portion adjacent the bottom of the container sloping upwardly and rearwardly, a handle secured to the rear portion of the container, said handle extending upwardly and rearwardly from the container a distance sufficient to supply controlling leverage to the apparatus, a wheeled truck frame, container connecting means for releasably securing the container to the frame, a front wall extending across the open end of the container, and connecting means for securing the front wall to the frame in abutting engagement with the forward edges of the side wall whereby the container may be removed from the wheeled truck frame independently of the frame and the front wall.

2. A multi-purpose hauling apparatus for agglomerate materials and the like comprising an open-topped container having a bottom, said bottom having smooth, uninterrupted upper and lower surfaces, a pair of side walls, a rear wall, said rear wall having at least its lower portion adjacent the bottom of the container sloping upwardly and rearwardly, a handle secured to the rear portion of the container, said handle extending upwardly and rearwardly from the container a distance sufficient to supply controlling leverage to the apparatus, a wheeled truck frame, container connecting means for releasably securing the container to the frame, a front wall extending across the open end of the container, and connecting means for securing the front wall to the frame in abutting engagement with the forward edges of the side wall whereby the container may be removed from the wheeled truck frame independently of the frame and the front wall, said connecting means including an upstanding member on each side of the truck frame near the front, each of said upstanding members having at least one slotted keyhole, and front wall connectors adapted to be received within the keyhole to thereby secure the front wall to the wheeled truck frame.

3. The multi-purpose hauling apparatus of claim 2 further characterized, firstly, in that each of the upstanding members includes a rearwardly extending flange which confines sidewise movement of the front ends of the side walls, and, secondly, in that the container connecting means are located on the wheeled truck frame a substantial distance to the rear of the front of the frame to thereby maintain the container rigidly aligned on the frame.

References Cited in the file of this patent

UNITED STATES PATENTS

| | | |
|---|---|---|
| 858,076 | Kemp | June 25, 1907 |
| 2,461,353 | Stezler et al. | Feb. 8, 1949 |
| 2,507,732 | Morgan | May 16, 1950 |
| 2,891,332 | Kacian | June 23, 1959 |
| 2,895,238 | Long | July 21, 1959 |

FOREIGN PATENTS

| | | |
|---|---|---|
| 481,758 | Great Britain | Mar. 17, 1938 |
| 916,906 | France | Aug. 26, 1946 |